Patented Dec. 19, 1922.

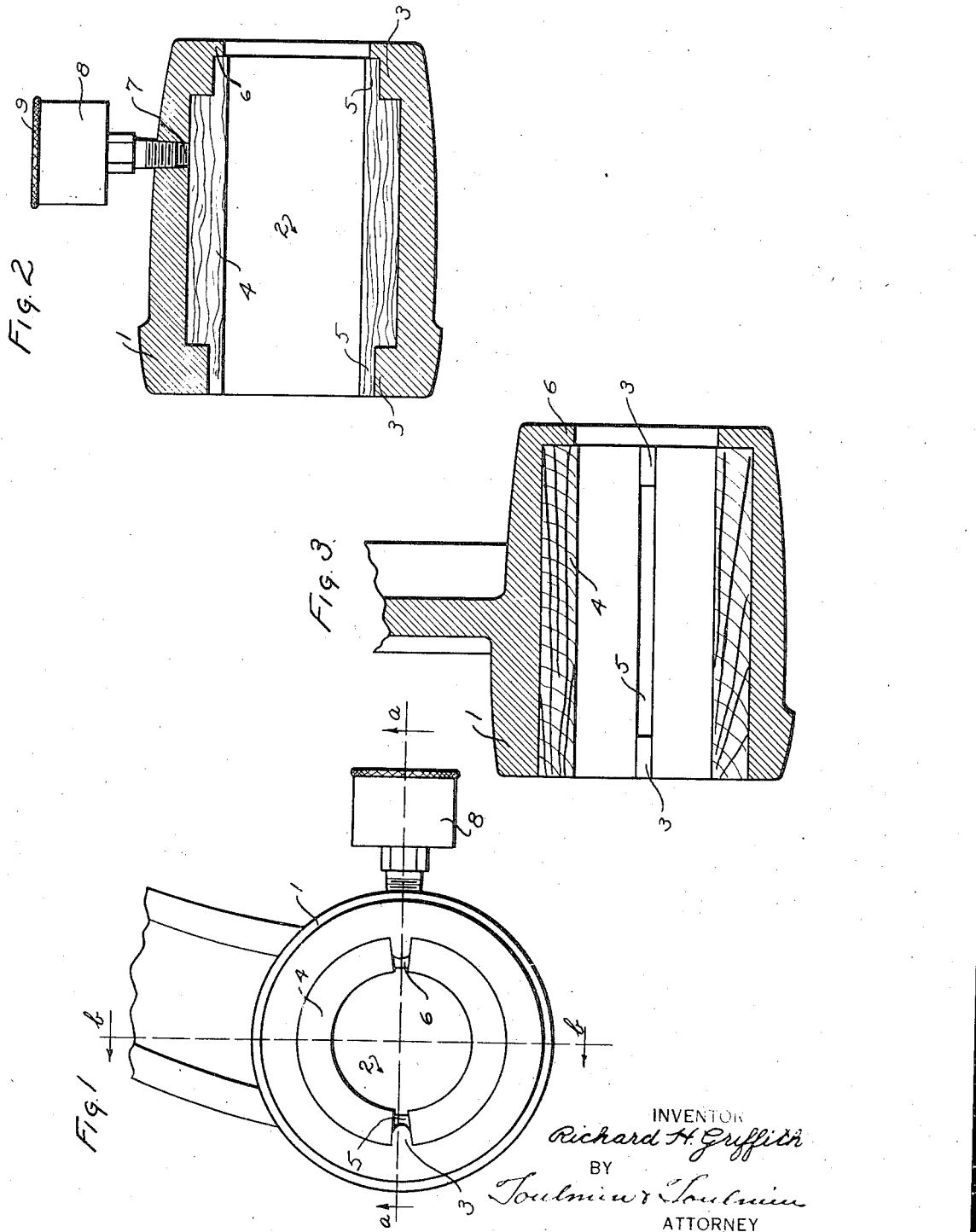

1,439,161

UNITED STATES PATENT OFFICE.

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

BEARING.

Application filed March 19, 1921. Serial No. 453,550.

*To all whom it may concern:*

Be it known that I, RICHARD H. GRIFFITH, a citizen of the United States, residing at Bellevue, in the county of Huron and State of Ohio, have invented certain new and useful Improvements in Bearings, of which the following is a specification, reference being had therein to the accompanying drawing.

My invention relates to bearings and in particular to a type of self-oiling bearing.

The object of my invention is to provide a cheap bearing that will eliminate the necessity for close machine work of expensive character and which will provide a means of oiling the bearing to constantly supply clean lubricant to it. It is a further object of my invention to not only provide a constant supply of lubricant under pressure, if desired, but also to prevent the clogging with dirt or other foreign material of this source. It is a further object of my invention to provide a reservoir for the lubricant to distribute it throughout the entire length of the bearing and to various portions of the bearing so as to provide an even distribution to all parts of the mechanism and to obviate the difficulties heretofore encountered with the distribution of lubricant, particularly hard grease, where it was conveyed through a single orifice to a bearing that became easily clogged with dirt. This has resulted in only a portion of the bearing being thoroughly lubricated due to these causes or low temperature or insufficient supply.

It is a further object to provide a bearing that can be easily removed without tools and new parts inserted that are liable to wear. It is a further object to provide an easily disassembled structure that can be cleaned and reassembled by unskilled persons. It is also an object to provide bearing members that are interchangeable with each other and interchangeable end for end to compensate for wear and to provide additional life of the members, particularly when new bearing members cannot be obtained readily and it is essential to continue the operation of the machine, as in the case of agricultural implements during the season of their use.

Referring to the drawings:

Fig. 1, is a side elevation of a completed bearing;

Fig. 2, is a section on the line *a—a* of Figure 1, with the grease cup in full lines; and, Fig. 3, is a section on the line *b—b* of Figure 1.

Referring to the drawings, 1 is a casing or supporting member for the bearing that has a cylindrical aperture 2 therein passing throughout its entire length. On the interior of this bearing member of cylindrical form are located shoulders or ribs 3 near either end of the bearing and spaced from one another. These shoulders serve as spacing members, as well as positioning supports for the bearing members proper 4—4. In this particular bearing I employ wooden members 4 of semi-circular shape which can be easily withdrawn from the interior of the bearing member 1 and new ones installed when replacements are necessary. By the use of wood I am enabled to secure a very cheap bearing material which needs no expensive machining and which is economical to replace. Any hardwood of the desired characteristics well known in the art may be employed. These semi-circular bearing members 4—4 are spaced from one another by the shoulders 3 leaving a longitudinal space 5 between 4—4 and between 3—3. 4—4 are retained in position by the shoulders 6. A similar aperture or reservoir 5 is formed between 4—4 with which communicates the passage way 7 from the grease cup 8. When the grease is forced through 7 from 8 by turning the knurled head 9 of the grease cup it fills the longitudinal passage way 5 as the member being supported prevents it from pouring out into the bearing directly. As the member which is supported turns in the bearing it carries with it a film of lubricant that has been distributed on it throughout its length. This lubricant is carried around in the bearing and some of it is deposited gradually in the trough 5. This serves to maintain a reservoir or supply of lubricant on that side of the bearing for distribution to the adjacent members of the mechanism. Customarily, however, when the parts are assembled, this reservoir 5 is filled with lubricant, but either practice may be followed.

By this arrangement I obviate the difficulty in former constructions of the passage way 7 becoming clogged with foreign material so that the grease could not be forced through it. As 7 does not open directly against the member which is being supported by the bearing but communicates with the trough 5, any foreign material which may have gathered adjacent the mouth of 7 can be thrust aside by the incoming lubricant and carried away into the passage way 5 without stopping the source of supply from communicating with the bearing. Furthermore, by reason of the easily detachable construction of the several members, it is possible to readily remove all the parts for cleaning and adjustment an item of considerable importance, particularly, in structures which are in the hands of unskilled users and must be of such a kind so to be readily handled by people of relatively small experience.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a bearing member, spacing members located on opposite sides at the end portions only of the interior thereof, bearing members spaced by said spacing members, and means for communicating with a reservoir formed by said bearing members and said spacing members for delivering lubricant thereto.

2. In combination in a bearing, a bearing support, detachable bearing members carried thereby, means of retaining said bearing members therein, spacing members interposed between said bearing members, said spacing members being separated from one another longitudinally to form a reservoir therebetween and between the bearing members, and means of delivering lubricant to said reservoir for distribution in the bearing.

3. In combination, a bearing supporting member, wooden bearing members, detachably secured in said supporting member, inwardly projecting spacing lugs located between said bearing members below the surface thereof and spaced from one another longitudinally so that reservoirs are formed between said wooden members and the spacing members, and means of communicating lubricant to one of said reservoirs.

4. In combination, a bearing supporting member, wooden bearing members, detachably secured in said supporting member, inwardly projecting spacing lugs located between said bearing members below the surface thereof and spaced from one another longitudinally so that reservoirs are formed between said wooden members and the spacing members, means of communicating lubricant to one of said reservoirs, and communicating lubricant under pressure.

5. In combination, a bearing supporting member having a shoulder on one end thereof for retaining bearing members, semi-circular bearing members spaced from one another on the interior thereof and detachably located therein, inwardly projecting spacing lugs below the surface of said bearing members and located between them, there being an aperture between each of said spacing members located on either end of said bearing forming a reservoir, and a second reservoir being located diagonally opposite from the first reservoir, and means of supplying lubricant thereto.

In testimony whereof I affix my signature.

RICHARD H. GRIFFITH.